US012634575B2

(12) United States Patent
Chang

(10) Patent No.: US 12,634,575 B2
(45) Date of Patent: May 19, 2026

(54) AIDED SYSTEM OF PHOTOGRAPHY COMPOSITION

(71) Applicant: Google LLC, Mountain View, CA (US)

(72) Inventor: John Chang, Mountain View, CA (US)

(73) Assignee: Google LLC, Mountain View, CA (US)

( * ) Notice: Subject to any disclaimer, the term of this patent is extended or adjusted under 35 U.S.C. 154(b) by 58 days.

(21) Appl. No.: 18/293,689

(22) PCT Filed: Jul. 1, 2022

(86) PCT No.: PCT/US2022/036033
§ 371 (c)(1),
(2) Date: Jan. 30, 2024

(87) PCT Pub. No.: WO2024/005846
PCT Pub. Date: Jan. 4, 2024

(65) Prior Publication Data
US 2024/0334043 A1 Oct. 3, 2024

(51) Int. Cl.
*H04N 23/60* (2023.01)
*H04N 23/63* (2023.01)

(52) U.S. Cl.
CPC ........... *H04N 23/64* (2023.01); *H04N 23/633* (2023.01)

(58) Field of Classification Search
CPC .. H04N 23/611; H04N 23/635; H04N 23/631; H04N 23/633; H04N 23/64; H04N 5/23229; H04N 5/2628; H04N 5/23293
See application file for complete search history.

(56) References Cited

U.S. PATENT DOCUMENTS

| | | | |
|---|---|---|---|
| 9,626,584 | B2 | 4/2017 | Lin et al. |
| 9,667,860 | B2 | 5/2017 | Hakim et al. |
| 9,727,802 | B2 | 8/2017 | Wang et al. |
| 10,924,661 | B2 | 2/2021 | Vasconcelos et al. |
| 11,100,325 | B2 | 8/2021 | Xu et al. |

(Continued)

FOREIGN PATENT DOCUMENTS

| | | |
|---|---|---|
| CN | 109146892 | 7/2018 |
| CN | 111327829 | 12/2021 |

OTHER PUBLICATIONS

EPO, International Search Report for International Patent Application No. PCT/US2022/036033, Mar. 24, 2023, 4 pages.

(Continued)

*Primary Examiner* — Xi Wang
(74) *Attorney, Agent, or Firm* — IP Spring

(57) ABSTRACT

A media application receives, from a server, an identification of a first composition type from a set of compositions to apply to an initial image captured with a user device. Responsive to one or more people being detected in the initial image, the media application generates a modified image, where the one or more people are removed from the initial image to obtain the modified image. The media application scores at least one candidate position within the modified image based on corresponding composition rules for the first composition type. The media application provides a graphical guide on a viewfinder of the user device to guide a user to capture a final image, wherein the graphical guide indicates a recommended position for the one or more people in the final image.

20 Claims, 11 Drawing Sheets

(56) References Cited

U.S. PATENT DOCUMENTS

| | | | |
|---|---|---|---|
| 2015/0201130 A1* | 7/2015 | Cho | H04N 1/00307 |
| | | | 348/333.05 |
| 2017/0111574 A1 | 4/2017 | Miyashita | |
| 2017/0193324 A1 | 7/2017 | Chen et al. | |
| 2021/0110589 A1 | 4/2021 | Zhang et al. | |
| 2024/0284041 A1* | 8/2024 | Kokubo | H04N 23/64 |

OTHER PUBLICATIONS

EPO, Written Opinion for International Patent Application No. PCT/US2022/036033, Mar. 24, 2023, 8 pages.
Greco, Luca et al., "Saliency based aesthetic cut of digital images", International conference on image analysis and processing. Springer, Berlin, Heidelberg, 2013, 10 pages.
Rawat, Yogesh Singh et al., "Context-Aware Photography Learning for Smart Mobile Devices", ACM Transactions on Multimedia Computing Communications and Applications, Association for Computing Machinery (US), vol. 12, No. 1, Oct. 21, 2015, pp. 1-24.

* cited by examiner

425

450

600

Receive, from a server, an identification of a first composition type from a set of compositions to apply to an initial image captured with the user device 602

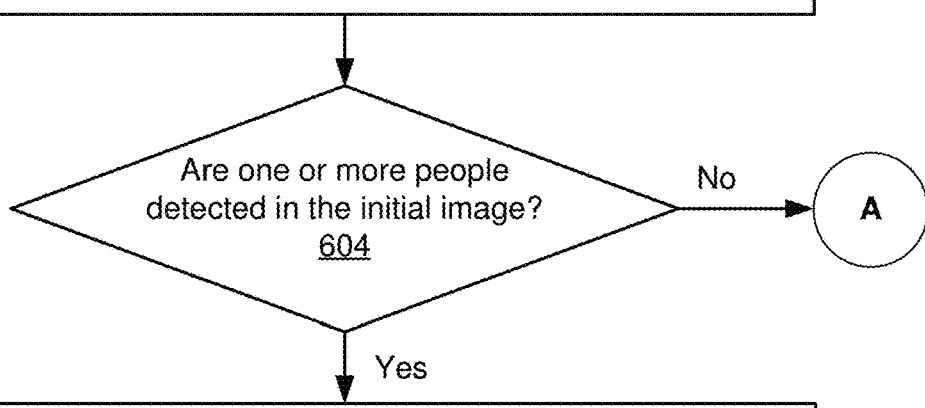

Are one or more people detected in the initial image? 604

No → A

Yes

Generate a modified image, where the one or more people are erased from the initial image to obtain the modified image 606

Score each candidate position of the one or more people within the modified image based on corresponding composition rules for the first composition type 608

Provide a graphical guide on a viewfinder of the user device to guide a user to capture a final image, where the graphical guide indicates a recommended position for the one or more people in the final image based on a corresponding score 610

Score each window based on corresponding composition rules for the first composition type 614

Provide a graphical guide on a viewfinder of the user device to guide a user to capture a final image 616

AIDED SYSTEM OF PHOTOGRAPHY COMPOSITION

CROSS-REFERENCE TO RELATED APPLICATIONS

This application is the U.S. National Stage filing under 35 U.S.C. § 371 of International Patent Application No. PCT/US2022/036033, filed on Jul. 1, 2022, which is incorporated herein by reference in its entirety for all purposes.

BACKGROUND

Various user devices, such as mobile phones, smart glasses, and digital cameras, allow users to capture images of scenes, people, monuments, events, etc. and share them with their friends and family. It can be very difficult to manually fit an object, such as a face, to a target background because the pictures of monuments, people, events, sights, etc., may not be symmetric, buildings may be skewed, and objects may be out-of-focus. In addition, there are computational limitations to performing high-intensity computing on user devices.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

A computer-implemented method includes receiving, from a server, an identification of a first composition type from a set of compositions to apply to an initial image captured with a user device. The method further includes responsive to one or more people being detected in the initial image. The method further includes generating a modified image, wherein the one or more people are removed from the initial image to obtain the modified image. The method further includes scoring at least one candidate position within the modified image based on corresponding composition rules for the first composition type. The method further includes providing a graphical guide on a viewfinder of the user device to guide a user to capture a final image, wherein the graphical guide indicates a recommended position for the one or more people in the final image based on a corresponding score.

In some embodiments, the method further includes providing a geographic location of the user device to the server, wherein the first composition type is selected based on the geographic location of the user device and receiving, from the server, a panoramic image that corresponds to the geographic location of the user device and image data that includes at least one window from the panoramic image that is based on the first composition type. In some embodiments, the image data further includes a saliency map of the panoramic image and a composition score for the at least one window from the panoramic image. In some embodiments, the method further includes generating the least one resized version of the one or more people removed from the initial image based on the height of the one or more people and a distance between the one or more people and a scene being captured by the user device and determining the at least one candidate position based on the at least one window from the panoramic image, a relative angle of the user device to the scene being captured by the user device, and the at least one resized version of the one or more people. In some embodiments, the method further includes determining the at least one candidate position within the modified image based on one or more landmarks at a geographic location of the user device. In some embodiments, the method further includes generating a cropped image from the final image based on the first composition type and responsive to the cropped image excluding one or more saliency points, storing the one or more saliency points as metadata associated with the cropped image. In some embodiments, generating the modified image includes: generating a mask of the one or more people, removing the mask from the initial image, and filling in, with pixels, empty space of the initial image that corresponds to the mask. In some embodiments, adjusting a size of the one or more people for each candidate position based on a distance from the one or more people to a scene being captured in the modified image. In some embodiments, the graphical guide updates as the user moves the user device to include an updated recommended position based on an updated initial image.

In some embodiments, a computing device comprises one or more processors and a memory coupled to the one or more processors, with instructions stored thereon that, when executed by the processor, cause the processor to perform operations. The operations may include receiving, from a server, an identification of a first composition type from a set of compositions to apply to an initial image captured with a user device, responsive to one or more people being detected in the initial image, generating a modified image, wherein the one or more people are removed from the initial image to obtain the modified image, scoring at least one candidate position within the modified image based on corresponding composition rules for the first composition type, and providing a graphical guide on a viewfinder of the user device to guide a user to capture a final image, wherein the graphical guide indicates a recommended position for the one or more people in the final image based on a corresponding score.

In some embodiments, the operations further include providing a geographic location of the user device to the server, wherein the first composition type is selected based on the geographic location of the user device and receiving, from the server, a panoramic image that corresponds to the geographic location of the user device and image data that includes at least one window from the panoramic image that is based on the first composition type. In some embodiments, the image data further includes a saliency map of the panoramic image and a composition score for the at least one window from the panoramic image. In some embodiments, the operations further include generating the least one resized version of the one or more people removed from the initial image based on the height of the one or more people and a distance between the one or more people and a scene being captured by the user device and determining the at least one candidate position based on the at least one window from the panoramic image, a relative angle of the user device to the scene being captured by the user device, and the at least one resized version of the one or more people. In some embodiments, the operations further include determining the at least one candidate position within the modified image based on one or more landmarks at a geographic location of the user device. In some embodiments, generating the modified image includes: generating a cropped image from the final image based on the first composition type and responsive to the cropped image excluding one or more saliency points, storing the one or more saliency points as metadata associated with the cropped image.

In some embodiments, non-transitory computer-readable medium with instructions stored thereon that, when executed by one or more computers, cause the one or more computers to perform operations. The operations may include receiving, from a server, an identification of a first composition type from a set of compositions to apply to an initial image captured with a user device, responsive to one or more people being detected in the initial image, generating a modified image, wherein the one or more people are removed from the initial image to obtain the modified image, scoring at least one candidate position within the modified image based on corresponding composition rules for the first composition type, and providing a graphical guide on a viewfinder of the user device to guide a user to capture a recommended image, wherein the graphical guide indicates a recommended position for the one or more people in the final image based on a corresponding score.

In some embodiments, the operations further include providing a geographic location of the user device to the server, wherein the first composition type is selected based on the geographic location of the user device and receiving, from the server, a panoramic image that corresponds to the geographic location of the user device and image data that includes at least one window from the panoramic image that is based on the first composition type. In some embodiments, the image data further includes a saliency map of the panoramic image and a composition score for the at least one window from the panoramic image. In some embodiments, the operations further include generating the least one resized version of the one or more people removed from the initial image based on the height of the one or more people and a distance between the one or more people and a scene being captured by the user device and determining the at least one candidate position based on the at least one window from the panoramic image, a relative angle of the user device to the scene being captured by the user device, and the at least one resized version of the one or more people. In some embodiments, the operations further include determining the at least one candidate position within the modified image based on one or more landmarks at a geographic location of the user device. In some embodiments, generating the modified image includes: receiving a first instruction from a user of the user device to capture the final image, receiving a second instruction from the user of the user device to crop the final image, and responsive to the cropped image excluding one or more saliency points, storing the one or more saliency points as metadata associated with the cropped image.

The specification advantageously identifies the geographic location of the user device and performs pre-calculation by determining, at a server, a first composition type from a set of compositions to apply to an initial image. For example, the server may determine that the first composition type is the rule of thirds. The media application on the user device estimates a height of one or more people in an initial image and removes the one or more people from the image to create a clear background. The media application scores each location of the one or more people within the initial image based on corresponding rules for the first composition type. For example, based on the rule of thirds, the one or more people should be in the middle of the image. The media application provides a graphical guide on a viewfinder to guide a user to capture a final image and updates the graphical guide to show an updated final image as the user device is moved. As a result, the media application is able to quickly and dynamically determine an angle of the user device for capturing an ideal image.

BRIEF DESCRIPTION OF THE DRAWINGS

FIG. 6A illustrates a flowchart for generating a graphical guide on a viewfinder with one or more people in a final image, according to some embodiments described herein.

DETAILED DESCRIPTION

Example Environment 100

Figure 1:
FIG. 1 is a block diagram of an example network environment, according to some embodiments described herein.

FIG. 1 illustrates a block diagram of an example environment 100. In some embodiments, the environment 100 includes a media server 101, a user device 115a, a user device 115n, and a location server 120 all coupled to a network 105. Users 125a, 125n may be associated with respective user devices 115a, 115n. In some embodiments, the environment 100 may include other servers or devices not shown in FIG. 1 or the location server 120 may not be included. In FIG. 1 and the remaining figures, a letter after a reference number, e.g., "115a," represents a reference to the element having that particular reference number. A reference number in the text without a following letter, e.g., "115," represents a general reference to embodiments of the element bearing that reference number.

The media server 101 may include a processor, a memory, and network communication hardware. In some embodiments, the media server 101 is a hardware server. The media server 101 is communicatively coupled to the network 105 via signal line 102. Signal line 102 may be a wired connection, such as Ethernet, coaxial cable, fiber-optic cable, etc., or a wireless connection, such as Wi-Fi®, Bluetooth®, or other wireless technology. In some embodiments, the media server 101 sends and receives data to and from one or more of the user devices 115a, 115n via the network 105. The media server 101 may include a media application 103a and a database 199.

The media application 103a may include code and routines (including one or more trained machine-learning models) operable to pre-compute several features for the user device 115. For example, the media application 103a may include a machine-learning model that is trained to receive a geographic location as input and determine a likelihood that features in an input image correspond to one or more composition types from a set of compositions based on the geographic location. For example, the media application 103a may determine that a first composition type is a rule of odds. In some embodiments, the machine-learning model also identifies windows within a panoramic image that corresponds to the geographic location. The media application 103a may transmit the panoramic image, image data about the panoramic image, such as the windows, and the first composition type to the user device 115.

In some embodiments, the media application 103a may be implemented using hardware including a central processing unit (CPU), a field-programmable gate array (FPGA), an application-specific integrated circuit (ASIC), machine learning processor/co-processor, any other type of processor, or a combination thereof. In some embodiments, the media application 103a may be implemented using a combination of hardware and software.

The database 199 may store panoramic images and image data corresponding to different geographic locations. The database 199 may also store social network data associated with users 125, user preferences for the users 125, etc.

The user device 115 may be a computing device that includes a memory, a hardware processor, and a camera. For example, the user device 115 may include a mobile device, a tablet computer, a mobile telephone, a wearable device, a head-mounted display, a mobile email device, a portable game player, a portable music player, a reader device, or another electronic device capable of accessing a network 105 and capturing images with a camera.

In the illustrated implementation, user device 115a is coupled to the network 105 via signal line 108 and user device 115n is coupled to the network 105 via signal line 110. The media application 103 may be stored as media application 103b on the user device 115a or media application 103c on the user device 115n. Signal lines 108 and 110 may be wired connections, such as Ethernet, coaxial cable, fiber-optic cable, etc., or wireless connections, such as Wi-Fi®, Bluetooth®, or other wireless technology. User devices 115a, 115n are accessed by users 125a, 125n, respectively. The user devices 115a, 115n in FIG. 1 are used by way of example. While FIG. 1 illustrates two user devices, 115a and 115n, the disclosure applies to a system architecture having one or more user devices 115.

The media application 103b stored on the user device 115a receives an identification of a first composition type from a set of compositions to apply to an initial image captured with the user device 115. Continuing with the example above, the first composition type may be a rule of odds. The media application 103b determines whether one or more people are in the initial image. In this example, one person is in the initial image. The media application 103b estimates a height of the person in the initial image.

The media application 103b generates a modified image where the person is erased from the initial image. For example, in the modified image, the pixels where the person is erased are replaced with pixels that match the background (e.g., the matching pixels can be obtained from a different image of the same scene). The media application 103b scores each candidate position within the modified image based on corresponding composition rules for the first composition type. For example, the media application 103b places an image of the person in different areas of the modified image and generates corresponding scores. Continuing with the above example, since a rule of odds composition looks for odd-numbered design elements, the person is placed in such a way that an odd number of objects are maintained in the modified image for the candidate positions. The media application 103b provides a graphical guide on a viewfinder of the user device 115a to guide a user to capture a final image based on a corresponding score. For example, the viewfinder includes a box that indicates that a person should be captured within the box at a recommended position.

The location server 120 may include a processor and a memory. In some embodiments, the location server 120 receives a query from a user device 115 for the geographic location of the user device 115. The location server 120 determines the geographic location of the user device 115 and provides a response to the user device's 115 query. For example, the location server 120 uses a global positioning system (GPS) to determine the location of the user device 115. The location server 120 is coupled to the network 105 via signal line 119.

Computing Device 200 Example

Figure 2:
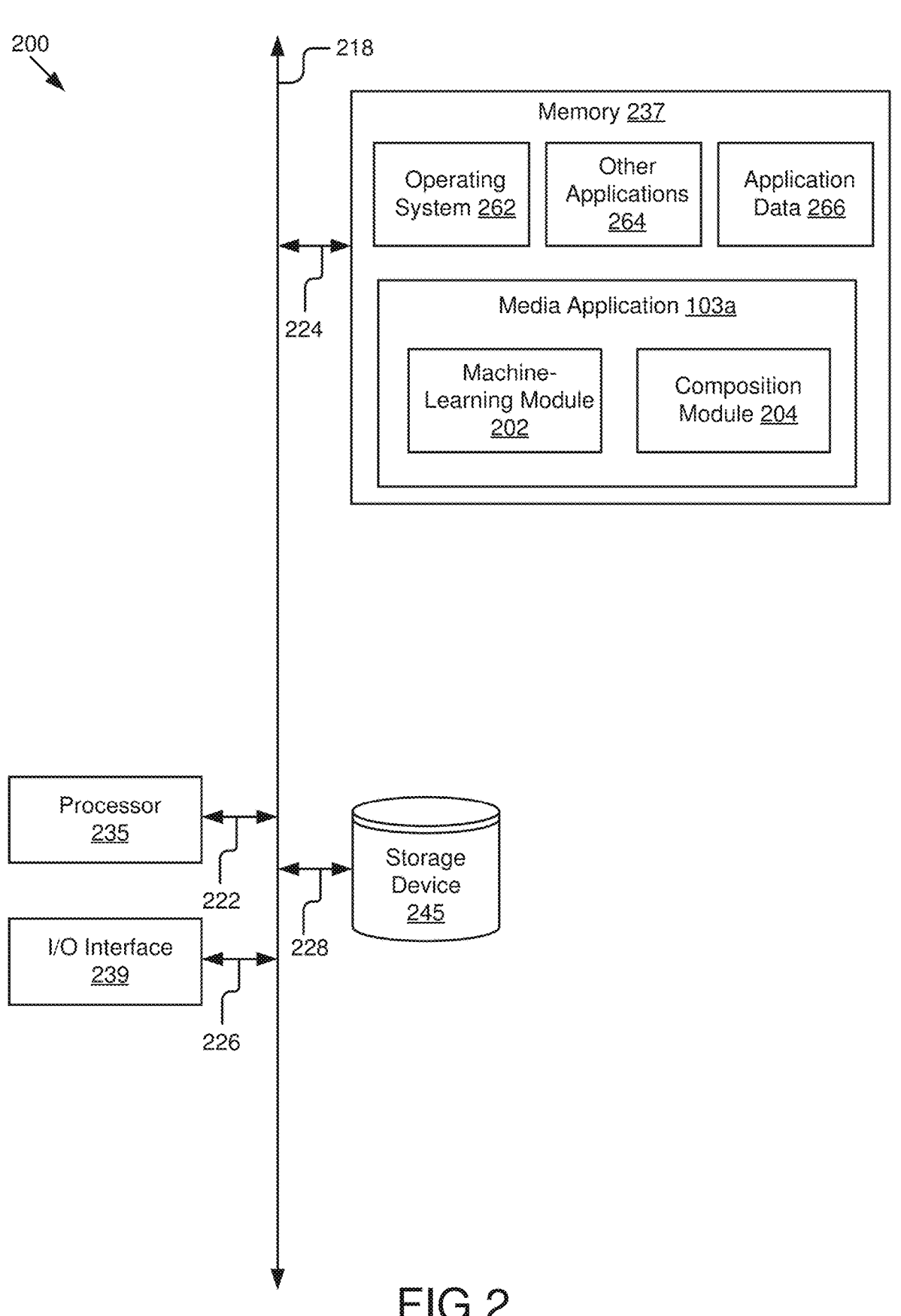
FIG. 2 is a block diagram of a first example computing device, according to some embodiments described herein.

FIG. 2 is a block diagram of an example computing device 200 that may be used to implement one or more features described herein. Computing device 200 can be any suitable computer system, server, or other electronic or hardware device. In one example, computing device 200 is media server 101 used to implement the media application 103a.

In some embodiments, computing device 200 includes a processor 235, a memory 237, an Input/Output (I/O) interface 239, and a storage device 245. The processor 235 may be coupled to a bus 218 via signal line 222, the memory 237 may be coupled to the bus 218 via signal line 224, the I/O interface 239 may be coupled to the bus 218 via signal line 226, and the storage device 245 may be coupled to the bus 218 via signal line 228.

Processor 235 can be one or more processors and/or processing circuits to execute program code and control basic operations of the computing device 200. A "processor" includes any suitable hardware system, mechanism or component that processes data, signals or other information. A processor may include a system with a general-purpose central processing unit (CPU) with one or more cores (e.g., in a single-core, dual-core, or multi-core configuration), multiple processing units (e.g., in a multiprocessor configuration), a graphics processing unit (GPU), a field-programmable gate array (FPGA), an application-specific integrated circuit (ASIC), a complex programmable logic device (CPLD), dedicated circuitry for achieving functionality, a special-purpose processor to implement neural network model-based processing, neural circuits, processors optimized for matrix computations (e.g., matrix multiplication), or other systems. In some embodiments, processor 235 may include one or more co-processors that implement neural-network processing. In some embodiments, processor 235 may be a processor that processes data to produce probabilistic output, e.g., the output produced by processor 235 may be imprecise or may be accurate within a range from an expected output. Processing need not be limited to a particular geographic location or have temporal limitations. For example, a processor may perform its functions in real-time, offline, in a batch mode, etc. Portions of processing may be performed at different times and at different locations, by different (or the same) processing systems. A computer may be any processor in communication with a memory.

Memory 237 is typically provided in computing device 200 for access by the processor 235, and may be any suitable processor-readable storage medium, such as random access memory (RAM), read-only memory (ROM), Electrical Erasable Read-only Memory (EEPROM), Flash memory, etc., suitable for storing instructions for execution by the processor or sets of processors, and located separate from processor 235 and/or integrated therewith. Memory 237 can store software operating on the computing device 200 by the processor 235, including a media application 103.

The memory 237 may include an operating system 262, other applications 264, and application data 266. Other applications 264 can include, e.g., an image library application, an image management application, an image gallery application, communication applications, web hosting engines or applications, mapping applications, media sharing applications, etc. One or more methods disclosed herein can operate in several environments and platforms, e.g., as a stand-alone computer program that can run on any type of computing device, as a web application having web pages, as a mobile application ("app") run on a mobile computing device, etc.

The application data 266 may be data generated by the other applications 264 or hardware of the computing device 200. For example, the application data 266 may include images used by the image library application and user actions identified by the other applications 264 (e.g., a social networking application), etc.

I/O interface 239 can provide functions to enable interfacing the computing device 200 with other systems and devices. Interfaced devices can be included as part of the computing device 200 or can be separate and communicate with the computing device 200. For example, network communication devices, storage devices (e.g., memory 237 and/or storage device 245), and input/output devices can communicate via I/O interface 239. In some embodiments, the I/O interface 239 can connect to interface devices such as input devices (keyboard, pointing device, touchscreen, microphone, scanner, sensors, etc.) and/or output devices (display devices, speaker devices, printers, monitors, etc.).

The storage device 245 stores data related to the media application 103a. For example, the storage device 245 may store a training data set that includes labelled images, a machine-learning model, output from the machine-learning model, etc. The labels may include indications of a particular type of composition that is associated with the image. In some embodiments, the labels are associated with a confidence value or a matching score. For example, one image may be a 100% match for a rule of thirds composition type, and only a 25% match for a L-arrangement composition type.

In some embodiments, the storage device 245 stores image sets that include panoramic images that are associated with a geographic location and corresponding image data. For example, the panoramic images capture 360-degree rotations at the geographic locations. In some embodiments where the media application 103a scores the images associated with the geographic location, the storage device 245 includes image data that includes pre-computed composition scores for each window in the panoramic images, saliency maps, and other metadata. In embodiments where the media application 103a is part of the media server 101, the storage device 245 is the same as the database 199 in FIG. 1.

FIG. 2 illustrates an example media application 103a that includes a machine-learning module 202 and a composition module 204.

The machine-learning module 202 generates a trained model that is herein referred to as a machine-learning model. In some embodiments, the machine-learning module 202 is configured to apply the machine-learning model to input data, such as application data 266 (e.g., an initial image captured by the user device 115) to identify the one or more composition types. In some embodiments, the machine-learning module 202 may include software code to be executed by processor 235. In some embodiments, the machine-learning module 202 is stored in the memory 237 of the computing device 200 and can be accessible and executable by the processor 235.

In some embodiments, the machine-learning module 202 may specify a circuit configuration (e.g., for a programmable processor, for a field programmable gate array (FPGA), etc.) enabling processor 235 to apply the machine-learning model. In some embodiments, the machine-learning module 202 may include software instructions, hardware instructions, or a combination. In some embodiments, the machine-learning module 202 may offer an application programming interface (API) that can be used by the operating system 262 and/or other applications 264 to invoke the machine-learning module 202, e.g., to apply the machine-learning model to application data 266 to output the composition type.

An image as referred to herein can include a digital image having pixels with one or more pixel values (e.g., color values, brightness values, etc.). An image can be a static image (e.g., still photos, images with a single frame, etc.) or a motion image (e.g., an image that includes a plurality of frames, such as animations, animated GIFs, cinemographs where a portion of the image includes motion while other portions are static, etc.). Although this application is written describing modification of images, persons of ordinary skill in the art will recognize that the method may be applied to video as well.

The type of composition may include, for example, rule of thirds, phi grid, symmetry, spiral section, Fibonacci spiral (aka golden spiral), golden section, golden triangles, harmonious triangles, cross, focal mass, v-arrangement, vanishing point, diagonal, radial, framing depth, landscape depth, leading lines, lines and patterns, 1-arrangement, compound curve, pyramid, circular, etc. that determine visual similarity in clusters using vectors in a multidimensional feature space (embedding).

The machine-learning module 202 uses training data to generate a trained machine-learning model. For example, training data may include ground truth data in the form of panoramic images that include a 360-degree rotation at a geographic location, one or more images cropped from the panoramic images, and clusters of the images that are associated with labels for the type of composition for each cluster. In some embodiments, the descriptions of the visual similarity may include feedback from users about whether the images in a cluster are properly categorized as being part of the same type of composition. In some embodiments, the descriptions of the visual similarity may be automatically added by image analysis. For example, the images may be associated with a percentage match for a particular type of composition.

In some embodiments, the images are further described by one or more of contour, feature points, saliency points, face information, and object detection. Contours are a curve joining all the continuous points in an image along a boundary that have the same color or intensity. Feature points are the points corresponding to objects in an image. Saliency points are regions of interest within the image where a person is likely to look. Face information includes, for example, a location within the image of the face, a gaze of the face (e.g., pose angle), etc. Because each composition type adheres to different rules, breaking the image down based on one or more of contour, feature points, saliency points, face information, and object detection is helpful for determining which composition type is the best match. For example, an image that is best described by a compound curve composition curve has contours that look very different than an image that is best described by an L-arrangement.

Training data may be obtained from any source, e.g., a data repository specifically marked for training, data for which permission is provided for use as training data for machine learning, etc. In some embodiments, the training may occur on the media server 101 that provides the training data directly to the user device 115, the training occurs locally on the user device 115, or a combination of both.

In some embodiments, the machine-learning module 202 uses the training data to generate clusters of images based on the labels for images identifying a type of composition. In some embodiments, the machine-learning module 202 generates clusters of images based on one or more of contour, feature points, saliency points, face information, and object detection for the images.

Images for each composition type may have similar feature vectors, e.g., vector distance between the feature vectors of images in each composition type may be lower than the vector distance between dissimilar images. The feature space may be a function of various factors of the image, e.g., the depicted subject matter (objects detected in the image), composition of the image, color information, image orientation, image metadata, specific objects recognized in the image (e.g., with user permission, a known face), etc.

In some embodiments, training data may include synthetic data generated for the purpose of training, such as data that is not based on activity in the context that is being trained, e.g., data generated from simulated or computer-generated images/videos, etc. In some embodiments, the machine-learning module 202 uses weights that are taken from another application and are unedited/transferred. For example, in these embodiments, the trained model may be generated, e.g., on a different device, and be provided as part of the media application 103. In various embodiments, the trained model may be provided as a data file that includes a model structure or form (e.g., that defines a number and type of neural network nodes, connectivity between nodes and organization of the nodes into a plurality of layers), and associated weights. The machine-learning module 202 may read the data file for the trained model and implement neural networks with node connectivity, layers, and weights based on the model structure or form specified in the trained model.

The trained machine-learning model may include one or more model forms or structures. For example, model forms or structures can include any type of neural-network, such as a linear network, a deep-learning neural network that implements a plurality of layers (e.g., "hidden layers" between an input layer and an output layer, with each layer being a linear network), a convolutional neural network (e.g., a network that splits or partitions input data into multiple parts or tiles, processes each tile separately using one or more neural-network layers, and aggregates the results from the processing of each tile), a sequence-to-sequence neural network (e.g., a network that receives as input sequential data, such as words in a sentence, frames in a video, etc. and produces as output a result sequence), etc.

The model form or structure may specify connectivity between various nodes and organization of nodes into layers. For example, nodes of a first layer (e.g., input layer) may receive data as input data or application data. Such data can include, for example, one or more pixels per node, e.g., when the trained model is used for analysis e.g., of a panoramic image. Subsequent intermediate layers may receive as input, output of nodes of a previous layer per the connectivity specified in the model form or structure. These layers may also be referred to as hidden layers. For example, a first layer may output one or more composition types that apply to the panoramic image. The one or more composition types may then serve as input to a second layer that outputs one or more images that are cropped from the panoramic image that conform to the rules for the one or more composition types. A final layer (e.g., output layer) produces an output of the machine-learning model. For example, the output may be an indication of one or more composition types and one or more images that best conform to the one or more composition types. In some implementations, model form or structure also specifies a number and/or type of nodes in each layer.

In different implementations, the trained model can include one or more models. One or more of the models may include a plurality of nodes, arranged into layers per the model structure or form. In some implementations, the nodes may be computational nodes with no memory, e.g., configured to process one unit of input to produce one unit of output. Computation performed by a node may include, for example, multiplying each of a plurality of node inputs by a weight, obtaining a weighted sum, and adjusting the weighted sum with a bias or intercept value to produce the node output. In some implementations, the computation performed by a node may also include applying a step/activation function to the adjusted weighted sum. In some implementations, the step/activation function may be a nonlinear function. In various implementations, such computation may include operations such as matrix multiplication. In some implementations, computations by the plurality of nodes may be performed in parallel, e.g., using multiple processors cores of a multicore processor, using individual processing units of a graphics processing unit (GPU), or special-purpose neural circuitry. In some implementations, nodes may include memory, e.g., may be able to store and use one or more earlier inputs in processing a subsequent input. For example, nodes with memory may include long short-term memory (LSTM) nodes. LSTM nodes may use the memory to maintain "state" that permits the node to act like a finite state machine (FSM).

In some implementations, the trained model may include embeddings or weights for individual nodes. For example, a model may be initiated as a plurality of nodes organized into layers as specified by the model form or structure. At initialization, a respective weight may be applied to a connection between each pair of nodes that are connected per the model form, e.g., nodes in successive layers of the neural network. For example, the respective weights may be randomly assigned, or initialized to default values. The model may then be trained, e.g., using training data, to produce a result.

Training may include applying supervised learning techniques. In supervised learning, the training data can include a plurality of inputs (e.g., images) and a corresponding expected output for each input (e.g., one or more composition types for each image). Based on a comparison of the output of the model with the expected output, values of the weights are automatically adjusted, e.g., in a manner that increases a probability that the model produces the expected output when provided similar input.

In various implementations, a trained model includes a set of weights, or embeddings, corresponding to the model structure. In some implementations, the trained model may include a set of weights that are fixed, e.g., downloaded from a server that provides the weights. In various implementations, a trained model includes a set of weights, or embeddings, corresponding to the model structure. In implementations where data is omitted, the machine-learning module 202 may generate a trained model that is based on prior training, e.g., by a developer of the machine-learning module 202, by a third-party, etc. In some implementations, the trained model may include a set of weights that are fixed, e.g., downloaded from a server that provides the weights.

In some embodiments, the machine-learning module 202 receives an identification of a geographic location associated with a user device and retrieves a panoramic image from the storage device 245 that corresponds to the geographic location. The machine-learning module 202 provides the panoramic image as input to the machine-learning model. In some embodiments, the machine-learning model determines a similarity of the panoramic image to clusters of images organized based on a type of composition.

The machine-learning model outputs an identification of one or more types of compositions from a set of compositions. In some embodiments, the machine-learning model outputs a confidence value for each type of composition. The confidence value may be expressed as a percentage, a number from 0 to 1, etc. For example, the machine-learning model outputs a confidence value of 85% for a golden spiral composition and 60% for a radial composition. In another example, the machine-learning model outputs a confidence value of 0.95 for leading line, 0.91 for golden spiral, and 0.01 for pyramid.

In some embodiments, the machine-learning model outputs one or more windows that are images that are cropped from the panoramic image that best match the type of composition. For example, where the panoramic image includes a spiral staircase and the composition type is a golden spiral, the machine-learning model crops the panoramic image so that the spiral staircase is in the center of the window. Continuing with the example, the machine-learning model also outputs a second window from the panoramic image where the composition type is a radial composition. The second window may overlap with the first window. In some embodiments, machine-learning model outputs coordinates for the windows instead of separate image files.

In some embodiments, the machine-learning module 202 receives feedback from a media application 103 on the user device 115. The feedback may take the form of an indication that a user captured an image that is different from what was recommended by a graphical guide on a viewfinder, instances where a user captured a final image that matches the graphical guide, where the user subsequently deleted the final image, shared the image, added the image to an album, etc. The machine-learning module 202 revises parameters for the machine-learning model based on the feedback.

The composition module 204 generates image data. In some embodiments, the composition module 204 includes a set of instructions executable by the processor 235 to generate the image data. In some embodiments, the composition module 204 is stored in the memory 237 of the computing device 200 and can be accessible and executable by the processor 235.

In some embodiments, the composition module 204 receives a panoramic image and one or more composition types from the machine-learning module 202. In some embodiments, the composition module 204 receives a panoramic image, one or more composition types, and an identification of windows within the panoramic image that best correspond to the composition types.

In some embodiments, the composition module 204 calculates composition scores for the windows within each panoramic image. In some embodiments where the composition module 204 does not receive an identification of the windows from the machine-learning module 202, the composition module 204 divides the panoramic image into a grid and the windows are generated based on the grid with overlapping windows to maximize variations of the scenes within the windows. For example, the composition module 204 divides the panoramic image into different windows and scores the windows based on whether the window includes landmarks (e.g., the Eiffel tower, a mountain, a river, a home, etc.) and other factors. In another embodiment where the composition module 204 does not receive an identification of the windows from the machine-learning module 202, the composition module 204 determines the windows based on landmarks within the panoramic image. For example, in an area with an open sky and four landmarks the composition module 204 generates windows that include one or more of the four landmarks and does not include windows of only the open sky.

In some embodiments, the composition module 204 ranks the windows based on the composition scores and recommends a subset of the ranked windows. For example, the composition module 204 recommends the top five windows. The composition module 204 translates a position of the windows to a relative angle of a user device 115 to the scene depicted in each window.

In some embodiments, the composition module 204 generates a saliency map for the panoramic image that identifies regions of interest within the panoramic image. The composition module 204 generates image data that includes the one or more windows (or coordinates for the one or more windows), one or more composition scores, and a saliency map for the panoramic image. The composition module 204 may transmit the one or more composition types, one or more of the panoramic images, and the corresponding image data to the media application 103 stored on the user device 115.

Computing Device 300 Example

Figure 3:
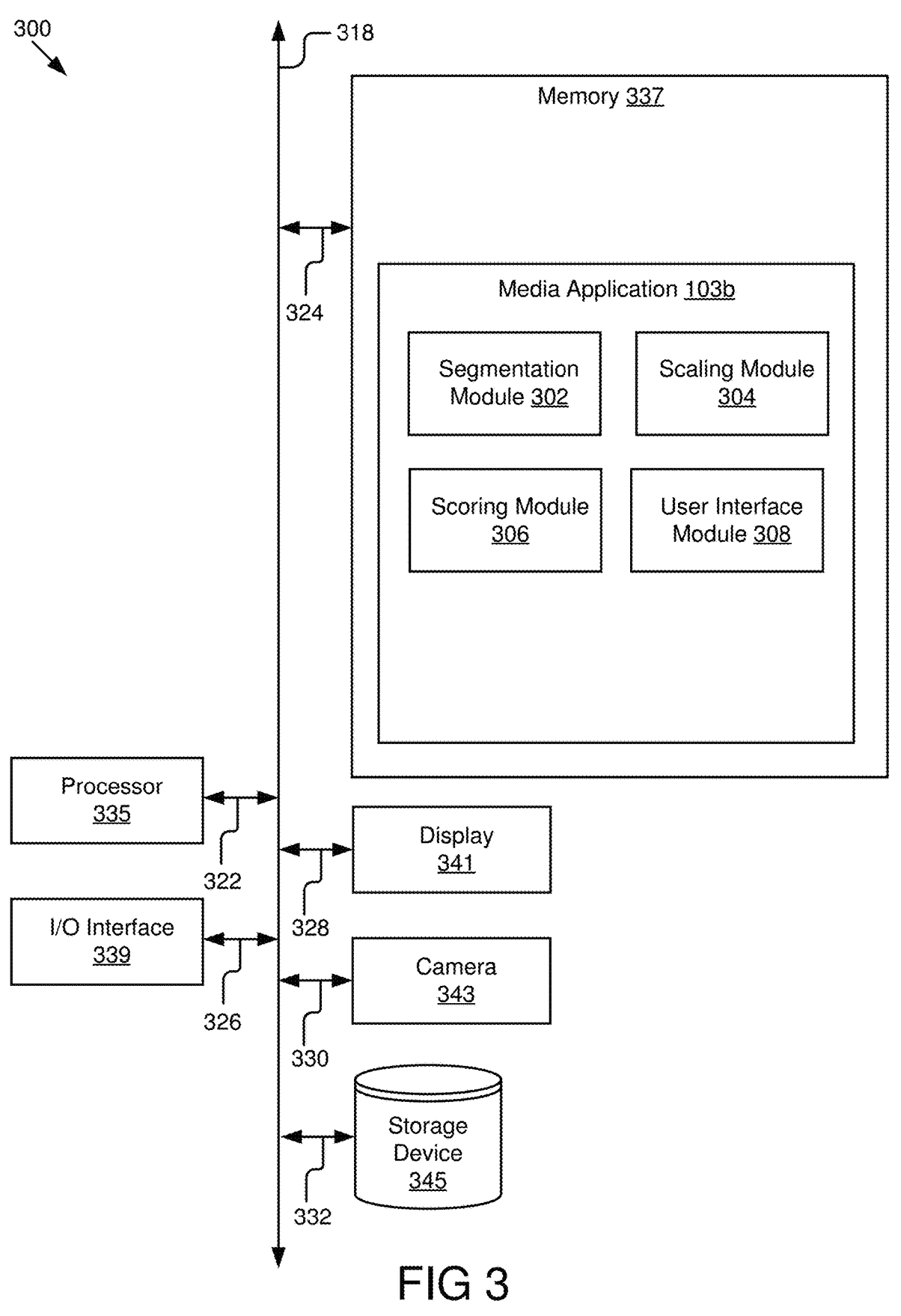
FIG. 3 is a block diagram of a second example computing device, according to some embodiments described herein.

FIG. 3 is a block diagram of an example computing device 300 that may be used to implement one or more features described herein. Computing device 300 can be any suitable computer system, server, or other electronic or hardware device. In one example, computing device 300 is a user device 115a used to implement the media application 103b.

In some embodiments, computing device 300 includes a processor 335, a memory 337, an I/O interface 339, a display 341, a camera 343, and a storage device 345. The processor 335 may be coupled to a bus 318 via signal line 322, the memory 337 may be coupled to the bus 318 via signal line 324, the I/O interface 339 may be coupled to the bus 318 via signal line 326, the display 341 may be coupled to the bus 318 via signal line 328, the camera 343 may be coupled to the bus 318 via signal line 330, and the storage device 345 may be coupled to the bus 318 via signal line 332.

The processor 335, the memory 337, and the I/O interface 339 are substantially similar to the processor 235, the memory 237, and the I/O interface 239 that are described in FIG. 2, and so, this description is not repeated here.

In addition to the above-referenced description of the I/O interface 239, some examples of interfaced devices that can connect to I/O interface 339 can include a display 341 that can be used to display content, e.g., images, video, and/or a user interface of an output application as described herein, and to receive touch (or gesture) input from a user. For example, display 341 may be utilized to display a user interface that includes a graphical guide on a viewfinder. Display 341 can include any suitable display device such as a liquid crystal display (LCD), light emitting diode (LED), or plasma display screen, cathode ray tube (CRT), television, monitor, touchscreen, three-dimensional display screen, or other visual display device. For example, display 341 can be a flat display screen provided on a mobile device, multiple display screens embedded in a glasses form factor or headset device, or a monitor screen for a computer device.

Camera 343 may be any type of image capture device that can capture images and/or video. In some embodiments, the camera 343 captures images or video that the I/O interface 339 transmits to the media application 103b.

In some embodiments, the camera 343 captures an initial image. The initial image may be captured without user input, e.g., without user input that directly instructs an image to be captured. For example, the initial image may be captured when a user 125 activates the media application 103b in order to generate a graphical guide with minimal delay.

The storage device 345 stores data related to the media application 103b. For example, the storage device 345 may store images captured by the camera 343, information received from the media application 103a on the media server 101, etc. In some embodiments, the storage device 345 stores profile information associated with the user 125.

Example Media Application 103b

In some embodiments, the media application 103b includes a segmentation module 302, a scaling module 304, a scoring module 306, and a user interface module 308.

The segmentation module 302 segments one or more people from an initial image. In some embodiments, the segmentation module 302 includes a set of instructions executable by the processor 335 to segment the one or more people from the initial image. In some embodiments, the segmentation module 302 is stored in the memory 337 of the computing device 300 and can be accessible and executable by the processor 335.

In some embodiments, the segmentation module 302 receives an initial image from the camera 343 via the I/O interface 339. The segmentation module 302 determines whether one or more people are present in the initial image. If one or more people are present in the initial image, the segmentation module 302 estimates a height of the one or more people.

If one or more people are present in the initial image, the segmentation module 302 generates a modified image by erasing the one or more people from the initial image. In some embodiments, the segmentation module 302 generates a mask of the one or more people in the initial image, removes the mask, and fills in empty space in the initial image with pixels. In some embodiments, the segmentation module 302 uses pixels from a corresponding panoramic image to fill in the empty spaces. For example, where an initial image includes a person in front of a landmark, the segmentation module 302 may use pixels of the landmark from the panoramic image (e.g., pixels representing portions of the landmark that are not obscured by the person) to fill in the empty spaces of the initial image.

The scaling module 304 resizes the one or more people in the initial image for candidate positions. In some embodiments, the scaling module 304 includes a set of instructions executable by the processor 335 to resize the one or more people. In some embodiments, the scaling module 304 is stored in the memory 337 of the computing device 300 and can be accessible and executable by the processor 335.

In some embodiments, the scaling module 304 determines candidate positions based on the windows in a panoramic image associated with the geographic location of the user device 115. The scaling module 304 may generate a resized version of the one or more people removed from the initial image based on the height of the one or more people and/or a distance between the one or more people and a scene being captured by the user device 115. For example, the scaling module 304 may use a depth estimation method to resize the one or more people to correspond to a distance of a landmark so that the size of the people makes sense as compared to the landmark.

The scaling module 304 may then determine the candidate position based on a window in the panoramic image, a relative angle of the user device 115 to the scene being captured by the user device, and the resized version of the one or more people. For example, the scaling module 304 may determine candidate positions of the resized versions of the one or more people in different positions in the windows from the panoramic image. In some embodiments, the scaling module 304 determines a relative angle of the user device 115 to the scene based on dynamic objects that are in the initial image and were not part of the panoramic image. For example, the scaling module 304 may determine a relative angle of the user device 115 to avoid a vehicle that is in the initial image and that was not in the panoramic image.

The scaling module 304 may determine the candidate position for every window in the panoramic image or for a subset of the windows, such as all the windows that correspond to the initial image. For example, the scaling module 304 may select all the windows that are in the direction the user device 115 is facing to become candidate positions.

In some embodiments where the scaling module 304 determines the candidate position for a subset of the windows, the scaling module 304 may determine the candidate position for additional windows as a user 125 moves the user device 115. For example, each time the user 125 moves the user device 115 more than a threshold amount, the camera 343 captures a subsequent image and the scaling module 304 determines the candidate position for additional windows to correspond to the subsequent image.

In some embodiments, the scaling module 304 determines the candidate positions based on a background scene. For example, the scaling module 304 may identify landmarks from the panoramic image and determine candidate positions that include a landmark. For each candidate position the scaling module 304 may generate a resized version of the one or more people removed from the initial image based on the height of the one or more people and/or a distance between the one or more people and the background scene.

The scoring module 306 generates a candidate score for each candidate position. In some embodiments, the scoring module 306 includes a set of instructions executable by the processor 335 to generate the candidate scores. In some embodiments, the scoring module 306 is stored in the memory 337 of the computing device 300 and can be accessible and executable by the processor 335.

In some embodiments, the scoring module 306 scores each candidate position based on the one or more composition types and the resized version of the one or more people. For example, a first candidate position includes a person directly in front of a pyramid and almost tall enough to obscure the pyramid and a second candidate position includes a person next to the pyramid and with a much smaller size than the pyramid. The scoring module 306 scores both candidate positions according to a composition type received from the media server 101 and recommends the second candidate position to the user 125.

The user interface module 308 generates a user interface. In some embodiments, the user interface module 308 includes a set of instructions executable by the processor 335 to generate the user interface. In some embodiments, the user interface module 308 is stored in the memory 337 of the computing device 300 and can be accessible and executable by the processor 335.

In some embodiments, once a user 125 activates the user interface module 308, the user interface module 308 transmits a geographic location of the user device 115 to the media server 101 via the I/O interface 339. In some embodiments, the user interface module 308 receives the geographic location from a third party, such as the location server 120 illustrated in FIG. 1. The I/O interface 339 may then provide an identification of the geographic location, which causes the other steps discussed above to initiate and provide the media application 103b with pre-computed information, such as the composition type and the panoramic image with windows that identify high ranking locations within the panoramic image.

The user interface module 308 generates a graphical guide on a viewfinder of the user device 115 to capture a final image. For example, the graphical guide may be a square or rectangle overlaid onto the viewfinder. In instances where the final image includes one or more people, the graphical guide indicates a recommended position for the one or more people in the final image based on a corresponding score generated by the scoring module 306. For example, the graphical guide may include an outline or the resized version of the one or more people to show where a person should move to reach the recommended position. In other examples, the recommended position may be any location where the person is captured within the graphical guide.

In some embodiments, the user interface module 308 generates a user interface with different framing modes. For example, the framing modes may include night sight, motion, portrait, camera, video, panorama, photo sphere, etc. In some embodiments, the user interface module 308 adjusts the graphical guide on the viewfinder for each framing mode.

In some embodiments, the graphical guide includes multiple suggestions for capturing the final image by adjusting the user device 115, including one or more of zooming in/out, rotating the user device, and changing the focus. For example, the scoring module 306 may select a recommended position from the candidate positions based on a person being closer than the current position of the person. As a result, the user interface module 308 generates a graphical guide with a suggestion to use zoom to increase the size of the person. In another example, where the recommended position has the people in a different position relative to a landmark, the graphical guide may provide instructions for moving the people, such as arrows or text to suggest that the people move positions or instructions for moving the user device 115 so that the people are within the final image.

In some embodiments, the graphical guide updates as a user 125 moves the user device 115. When a user 125 moves the user device 115 from a first position to a second position, the camera 343 may capture an updated initial image, the segmentation module 302 may generate a modified image, the scoring module 306 may score the candidate positions within the modified image, and the user interface module 308 may provide an updated recommended position based on the updated initial image.

In some embodiments, the user interface module 308 captures the final image within the graphical guide in response to the user providing an instruction. In some embodiments where the user interface includes a capture icon (e.g., a button) and a graphical guide (e.g., displayed on a touchscreen), the user interface module 308 captures the final image within the graphical guide in response to the user tapping within the graphical guide (e.g., single tap, double tap, etc.). In some embodiments, when the user interface module 308 captures the final image within the graphical guide, the user interface module 308 automatically stores the final image with the initial image as metadata in an image file record that is stored with the final image or as a separate image file record.

In some embodiments, the user interface module 308 generates a cropped image from the final image based on the first composition type. One advantage of the user interface module 308 generating the cropped image is that the user does not have to precisely aim the user device 115 and determine the best scene because the scoring module 306 determines the best recommended position and the user interface module 308 generates a cropped image from the final image. In some embodiments, the user interface module 308 also includes an undo button with the crop so that the user can undo the cropping function.

In some embodiments, the final image captured by the camera 343 excludes regions of interest, such as saliency points or other information, that indicates that an important portion of a scene is not included in the final image. For example, the user interface module 308 may generate a cropped image or the user may crop a portion of a final image or may use the user interface to zoom in on the graphical guide in the viewfinder. In some embodiments, the user interface module 308 stores the excluded regions of interest as metadata associated with the final image or also stores the initial image with the metadata to ensure that important information about the scene is retained.

In some embodiments, the user interface module 308 receives a first instruction from a user 125 to capture the final image. For example, the user 125 may select a capture icon, double tap on the viewfinder, etc. Once the final image is captured, the user interface module 308 generates options for modifying the final image. In some embodiments, the user interface module 308 receives a second instruction from the user 125 to crop the final image. In instances where cropping the final image results in exclusion of one or more saliency points, the user interface module 308 may store the one or more saliency points as metadata associated with the cropped image. This prevents potentially important parts of the image from being lost in the cropping of the final image.

Figure 4A:
FIG. 4A illustrates an example initial image, according to some embodiments described herein.

The following is a visual example of the images. FIG. 4A illustrates an example initial image 400. For example, the initial image 400 may be captured by the camera 343 without input from the user. In this example, a woman is in front of a city with many landmarks.

Figure 4B:
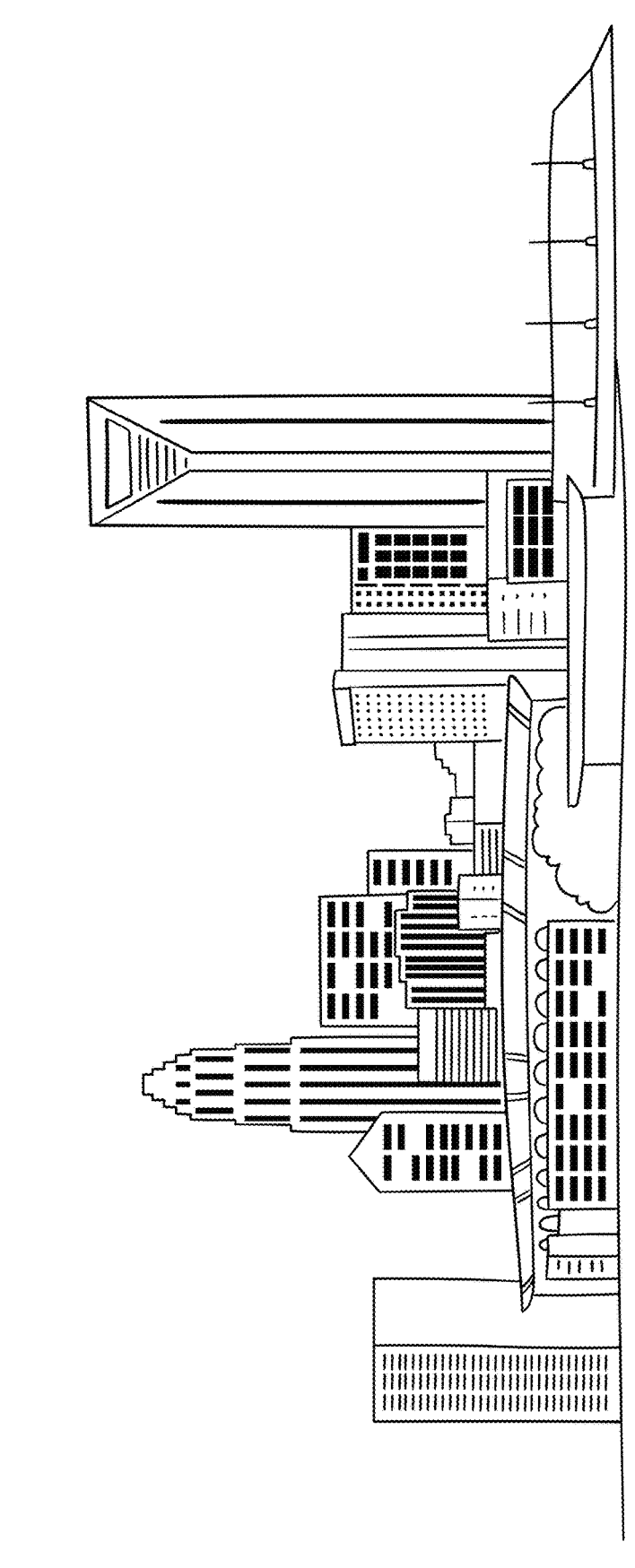
FIG. 4B illustrates an example modified image with a person resized for candidate positions, according to some embodiments described herein.

FIG. 4B illustrates an example modified image 425 where the person is removed to create a modified image, for example, by generating a mask of the person, removing the pixels associated with the with the person in the initial image, and replacing those pixels with background pixels retrieved from a panoramic image that include the scene captured by the initial image (without the person being present in the same location).

Figure 4C:
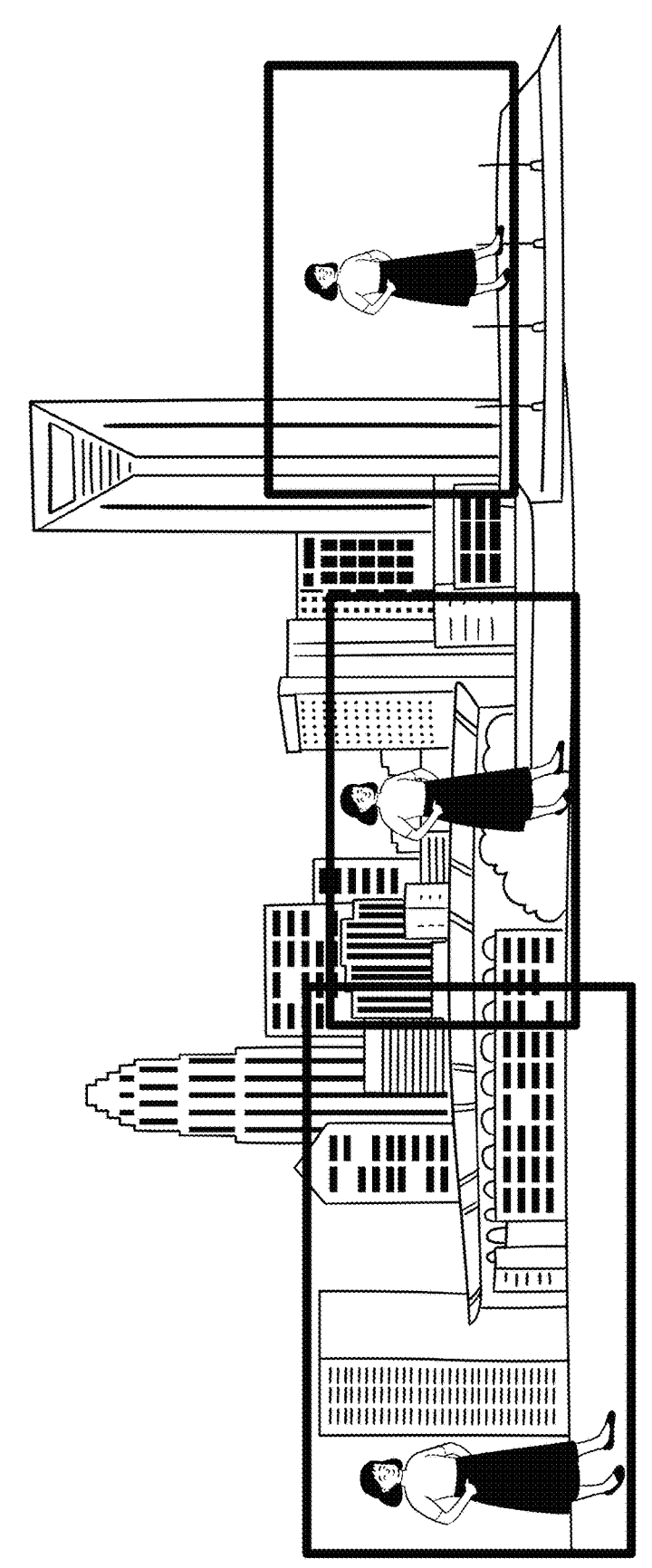
FIG. 4C illustrates an example modified image with candidate positions, according to some embodiments descried herein.

FIG. 4C illustrates an example modified image 450 with candidate positions of the person within windows in the modified image 450. The scaling module 304 resizes a version of the person removed from the initial image for each of the windows. The scoring module 306 scores each of the candidate positions and ranks the candidate positions. In this example, three candidate positions are illustrated, but a greater number of candidate positions are possible.

Figure 4D:
FIG. 4D illustrates an example user interface that includes a graphical guide with a recommended position for the one or more people to move to for capturing a final image, according to some embodiments described herein.

FIG. 4D illustrates an example user interface that includes a graphical guide with a recommended position for the one or more people to move to for capturing a final image. In this example, the viewfinder displayed a graphical guide for the candidate position with the best ranking. In other examples, the viewfinder may display several different best ranking candidate positions. Accordingly, the method allows to (at least partially) automatically fit an object, such as a person, to a target background, without any need to change the physical position of the camera and/or the object with respect to the target background.

Figure 5:
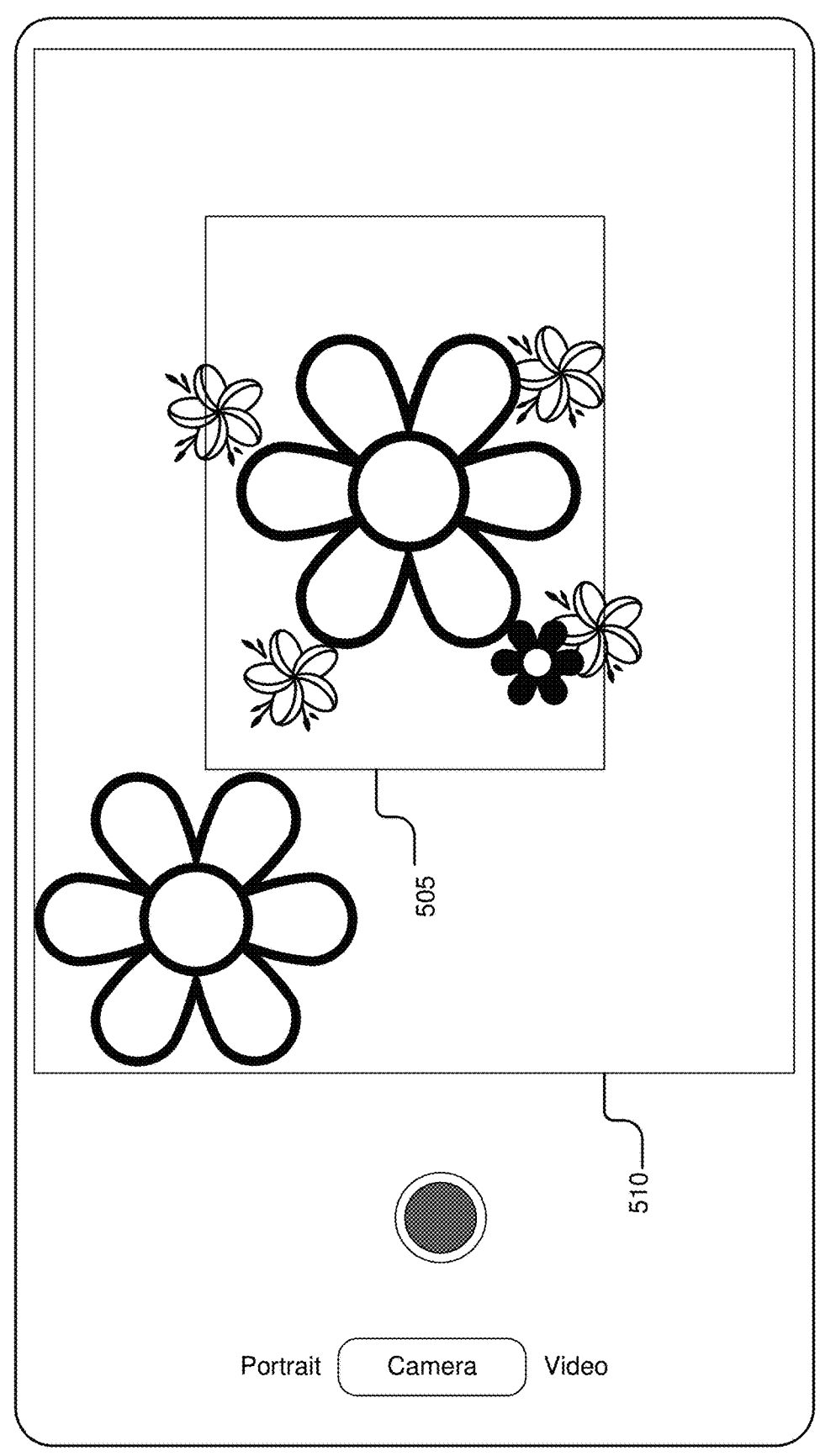
FIG. 5 illustrates an example user device with a user interface that includes a graphical guide on a viewfinder where the final image does not include people, according to some embodiments described herein.

In some embodiments, the initial image does not include one or more people. As a result, the scoring module 306 may score each window based on composition rules for the first composition type or the user interface module 308 may determine the scores for each window directly from the metadata received with the panoramic image. The user interface module 308 may generate a graphical guide on a viewfinder of the user device to guide the user to capture a final image. For example, turning to FIG. 5 an example user device 115 with a user interface 500 is illustrated that includes a graphical guide 505 on a viewfinder 510. In this example, a final image does not include people and is instead an image of a flower. The composition type is for the rule of central and the graphical guide is a square that adheres to the rule of central by framing the center of the flower as the final image.

Example Flowcharts

FIG. 6A illustrates a flowchart 600 for generating a graphical guide on a viewfinder with one or more people in a final image, according to some embodiments described herein. The method illustrated in flowchart 600 may be performed by the computing device 300 in FIG. 3. For example, the computing device 300 is the user device 115 and includes a media application 103*b*. In some embodiments, one or more blocks of FIG. 6, or portions thereof, can be performed by a different device than shown, e.g., one or more blocks performed by media server 101 can be performed by user device 115 and/or one or more blocks performed by user device 115 can be performed by media server 101.

The method 600 of FIG. 6A may begin at block 602. At block 602, an identification of a first composition type from a set of compositions is received from a server, such as the media server 101, to apply to an initial image captured with the user device 115. In some embodiments, the media server 101 received an identification of the geographic location of the user device 115 and the first composition type is based on the geographic location. In some embodiments, a panoramic image corresponding to the geographic location is also received. For example, the panoramic image depicts a scene that includes at least a portion of the scene captured by the initial image. Block 602 may be followed by block 604.

At block 604, it is determined whether one or more people are detected in the initial image. If one or more people are not detected in the initial image, the method 600 proceeds to FIG. 6B. If one or more people are detected in the initial image, block 604 may be followed by block 606.

At block 606, a modified image is generated where the one or more people are erased from the initial image to obtain the modified image. In some embodiments, the modified image is generated by generating a mask of the one or more people, removing the mask from the initial image, and filling in the pixels from the mask with corresponding pixels from the panoramic image. In some embodiments, candidate positions are generated within the modified image. Block 606 may be followed by block 608.

At block 608, each candidate position of the one or more people within the modified image is scored based on corresponding composition rules for the first composition type. In some embodiments, a version of the one or more people is resized and used for each of the candidate positions. Block 608 may be followed by block 610.

At block 610, a graphical guide is provided on a viewfinder of the user device 115 to guide a user to capture a final image, where the graphical guide indicates a recommended position for the one or more people in the final image based on a corresponding score.

Figure 6B:
FIG. 6B illustrates a flowchart for generating a graphical guide on a viewfinder with no people in a final image, according to some embodiments described herein.
Figure 6B:
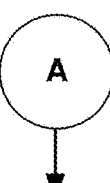

FIG. 6B illustrates a flowchart 600 for generating a graphical guide on a viewfinder with no people in a final image. The method 650 starts with block 614. At block 614 each window is scored based on composition rules for the first composition type. In some embodiments, the scoring occurred at the media server 101 and the media application 103 determines the score for each window. Block 614 may be followed by block 616.

At block 616 a graphical guide on a viewfinder of the user device 115 is provided to guide a user to capture a final image.

Figure 7:
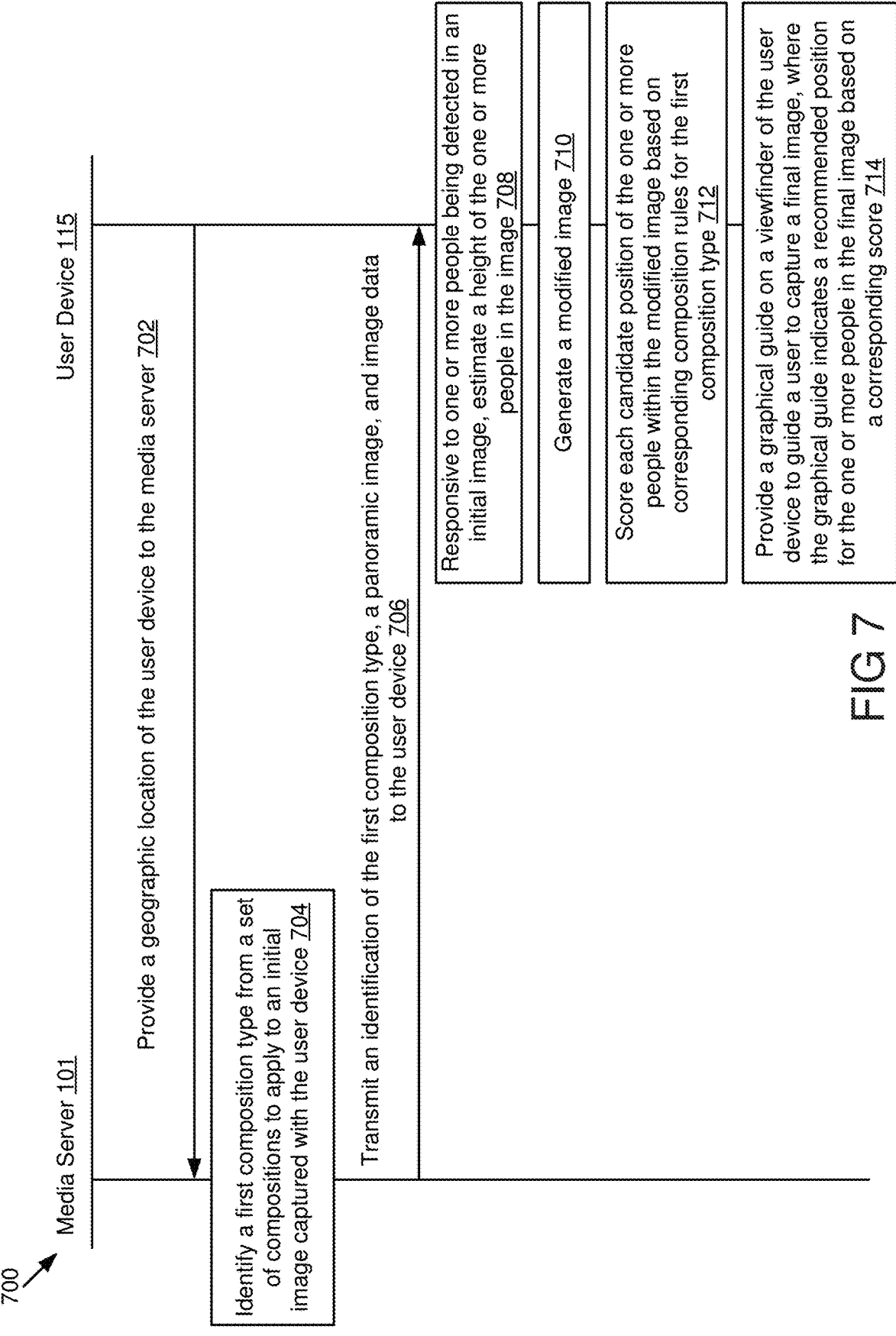
FIG. 7 illustrates a flowchart for generating a graphical guide on a viewfinder where a user device receives information from a media server, according to some embodiments described herein.

FIG. 7 illustrates a flowchart for generating a graphical guide on a viewfinder where a user device receives information from a media server, according to some embodiments described herein. The method illustrated in flowchart 700 may be performed by the computing device 200 in FIG. 2 and the computing device 300 in FIG. 3. For example, the computing device 200 in FIG. 2 may be the media server 101 and includes a media application 103*a* and the computing device 300 in FIG. 3 may be the user device 115 and includes a media application 103*b*. In some embodiments, one or more blocks of FIG. 7, or portions thereof, can be performed by a different device than shown, e.g., one or more blocks performed by media server 101 can be performed by user device 115 and/or one or more blocks performed by user device 115 can be performed by media server 101

The method 700 of FIG. 7 may begin at block 702. At block 702, the user device 115 provides a geographic location of the user device 115 to the media server 101. Block 702 may be followed by block 704.

At block 704, the media server 101 identifies a first composition type from a set of compositions to apply to an initial image captured with the user device 115. Block 704 may be followed by block 706.

At block 706, the media server 101 transmits an identification of the first composition, a panoramic image, and image data to the user device 115. Block 706 may be followed by block 708.

At block 708, the user device 115, responsive to one or more people being detected in an initial image, estimates a height of the one or more people in the image. Block 708 may be followed by block 710.

At block 710, a modified image is generated. For example, the one or more people are removed from the initial image and pixels of the one or more people are replaced with pixels that match the background as determined from the panoramic image. Block 710 may be followed by block 712.

At block 712, each candidate position of the one or more people within the modified image is scored based on the corresponding composition rules for the first composition type. Block 712 may be followed by block 714.

At block 714, a graphical guide is provided on a viewfinder of the user device 115 to guide a user to capture a final image, where the graphical guide indicates a recommended position for the one or more people in the final image based on a corresponding score.

Further to the descriptions above, a user may be provided with controls allowing the user to make an election as to both if and when systems, programs, or features described herein may enable collection of user information (e.g., information about a user's social network, social actions, or activities, profession, a user's preferences, or a user's current location), and if the user is sent content or communications from a server. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over what information is collected about the user, how that information is used, and what information is provided to the user.

In the above description, for purposes of explanation, numerous specific details are set forth in order to provide a thorough understanding of the specification. It will be apparent, however, to one skilled in the art that the disclosure can be practiced without these specific details. In some instances, structures and devices are shown in block diagram form in order to avoid obscuring the description. For example, the embodiments can be described above primarily with reference to user interfaces and particular hardware. However, the embodiments can apply to any type of computing device that can receive data and commands, and any peripheral devices providing services.

Reference in the specification to "some embodiments" or "some instances" means that a particular feature, structure, or characteristic described in connection with the embodiments or instances can be included in at least one implementation of the description. The appearances of the phrase "in some embodiments" in various places in the specification are not necessarily all referring to the same embodiments.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic data capable of being stored, transferred, combined, compared, and otherwise manipulated. It has proven convenient at times, principally for reasons of common usage, to refer to these data as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms including "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

The embodiments of the specification can also relate to a processor for performing one or more steps of the methods described above. The processor may be a special-purpose processor selectively activated or reconfigured by a computer program stored in the computer. Such a computer program may be stored in a non-transitory computer-readable storage medium, including, but not limited to any type of disk including optical disks, ROMs, CD-ROMs, magnetic disks, RAMS, EPROMs, EEPROMs, magnetic or optical cards, flash memories including USB keys with non-volatile memory, or any type of media suitable for storing electronic instructions, each coupled to a computer system bus.

The specification can take the form of some entirely hardware embodiments, some entirely software embodiments or some embodiments containing both hardware and software elements. In some embodiments, the specification is implemented in software, which includes, but is not limited to firmware, resident software, microcode, etc.

Furthermore, the description can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

A data processing system suitable for storing or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

What is claimed is:

1. A computer-implemented method comprising:
providing a geographic location of a user device to a server;
receiving, from the server, a panoramic image that corresponds to the geographic location of the user device, an identification of a first composition type from a set of compositions to apply to an initial image captured with the user device, and image data that describes one or more windows from the panoramic image that are based on the first composition type, wherein the first composition type is selected based on the geographic location of the user device;

responsive to one or more people being detected in the initial image, generating a modified image, wherein the one or more people are removed from the initial image to obtain the modified image;

determining one or more candidate positions within the modified image based on the one or more windows from the panoramic image;

scoring the one or more candidate positions within the modified image based on corresponding composition rules for the first composition type; and providing a graphical guide on a viewfinder of the user device to guide a user to capture a final image, wherein the graphical guide indicates one or more recommended positions for the one or more people in the final image based on one or more corresponding scores.

2. The method of claim 1, wherein the modified image is generated using pixels from the panoramic image that correspond to locations of pixels in the initial image where the one or more people are removed.

3. The method of claim 1, wherein the image data further includes a saliency map of the panoramic image and one or more composition scores that correspond to the one or more windows from the panoramic image.

4. The method of claim 1, further comprising:

generating one or more resized versions of the one or more people removed from the initial image by estimating one or more heights of the one or more people in the initial image and one or more distances between the one or more people and a scene being captured by the user device; and wherein determining the one or more candidate positions is further based on a relative angle of the user device to the scene being captured by the user device and the one or more resized versions of the one or more people.

5. The method of claim 1, wherein determining the one or more candidate positions within the modified image is further based on one or more landmarks at the geographic location of the user device.

6. The method of claim 1, further comprising:

generating a cropped image from the final image based on the first composition type; and responsive to the cropped image excluding one or more saliency points, storing the one or more saliency points as metadata associated with the cropped image.

7. The method of claim 1, wherein generating the modified image includes:

generating a mask of the one or more people;

removing the mask from the initial image; and filling in, with pixels, empty space of the initial image that corresponds to the mask.

8. The method of claim 1, further comprising adjusting one or more sizes of the one or more people for each candidate position based on one or more distances from the one or more people to a scene being captured in the modified image.

9. The method of claim 1, wherein the graphical guide updates as the user moves the user device to include one or more updated recommended positions based on an updated initial image.

10. A user device comprising:

one or more processors; and a memory coupled to the one or more processors, with instructions stored thereon that, when executed by the processor, cause the processor to perform operations comprising:

providing a geographic location of the user device to a server;

receiving, from the server, a panoramic image that corresponds to the geographic location of the user device, coordinates for a first window that is based on a first composition type from a set of compositions to apply to an initial image captured with a camera of the user device, and coordinates for a second window that is based on a second composition type from the set of compositions to apply to the initial image, wherein the first composition type and the second composition type are selected based on the geographic location of the user device;

responsive to one or more people being detected in the initial image generating a modified image, wherein the one or more people are removed from the initial image to obtain the modified image;

determining a first candidate position within the modified image based on the coordinates for the first window and a second candidate position within the modified image based on the coordinates for the second window;

scoring the first candidate position within the modified image based on corresponding composition rules for the first composition type;

scoring the second candidate position within the modified image based on corresponding composition rules for the second composition type; and providing a graphical guide on a viewfinder of the user device to guide a user to capture a final image, wherein the graphical guide indicates one or more recommended positions for the one or more people in the final image based on one or more corresponding scores.

11. The user device of claim 10, wherein the modified image is generated using pixels from the panoramic image that correspond to locations of pixels in the initial image where the one or more people are removed.

12. The user device of claim 10, wherein receiving the panoramic image from the server further includes receiving a saliency map of the panoramic image, a first composition score for the first window from the panoramic image, and a second composition score for the second window from the panoramic image.

13. The user device of claim 10, wherein the operations further comprise:

generating one or more resized versions of the one or more people removed from the initial image based on one or more heights of the one or more people and one or more distances between the one or more people and a scene being captured by the user device; and wherein determining the first candidate position and the second candidate position is further based on a relative angle of the user device to the scene being captured by the user device and the one or more resized versions of the one or more people.

14. The user device of claim 10, wherein determining the first candidate position within the modified image is further based on one or more landmarks at the geographic location of the user device.

15. The user device of claim 10, wherein the operations further comprise:

generating a cropped image from the final image based on the first composition type; and responsive to the cropped image excluding one or more saliency points, storing the one or more saliency points as metadata associated with the cropped image.

16. A non-transitory computer-readable medium with instructions stored thereon that, when executed by one or more computers, cause the one or more computers to perform operations, the operations comprising:

providing a geographic location of a user device to a server;

receiving, from the server, a panoramic image that corresponds to the geographic location of the user device, an identification of a first composition type from a set of compositions to apply to an initial image captured with the user device, and image data that describes one or more windows from the panoramic image that are based on the first composition type, wherein the first composition type is selected based on the geographic location of the user device;

responsive to one or more people being detected in the initial image, generating a modified image, wherein the one or more people are removed from the initial image to obtain the modified image;

determining one or more candidate positions within the modified image based on the one or more windows from the panoramic image;

scoring the one or more candidate positions within the modified image based on corresponding composition rules for the first composition type; and providing a graphical guide on a viewfinder of the user device to guide a user to capture a final image, wherein the graphical guide indicates one or more recommended positions for the one or more people in the final image based on one or more corresponding scores.

17. The non-transitory computer-readable medium of claim 16, wherein the modified image is generated using pixels from the panoramic image that correspond to locations of pixels in the initial image where the one or more people are removed.

18. The non-transitory computer-readable medium of claim 16, wherein the image data further includes a saliency map of the panoramic image and one or more composition scores that correspond to the one or more windows from the panoramic image.

19. The non-transitory computer-readable medium of claim 16, wherein the operations further comprise:

generating one or more resized versions of the one or more people removed from the initial image by estimating one or more heights of the one or more people in the initial image and one or more distances between the one or more people and a scene being captured by the user device; and wherein determining the one or more candidate positions is further based on a relative angle of the user device to the scene being captured by the user device and the one or more resized versions of the one or more people.

20. The non-transitory computer-readable medium of claim 16, wherein determining the one or more candidate positions within the modified image is further based on one or more landmarks at the geographic location of the user device.

* * * * *